(No Model.) 3 Sheets—Sheet 1.
E. SAMUEL.
DEVICE FOR CONTROLLING THE MOTIVE POWER AND BRAKES OF POWER DRIVEN CARS.
No. 336,751. Patented Feb. 23, 1886.
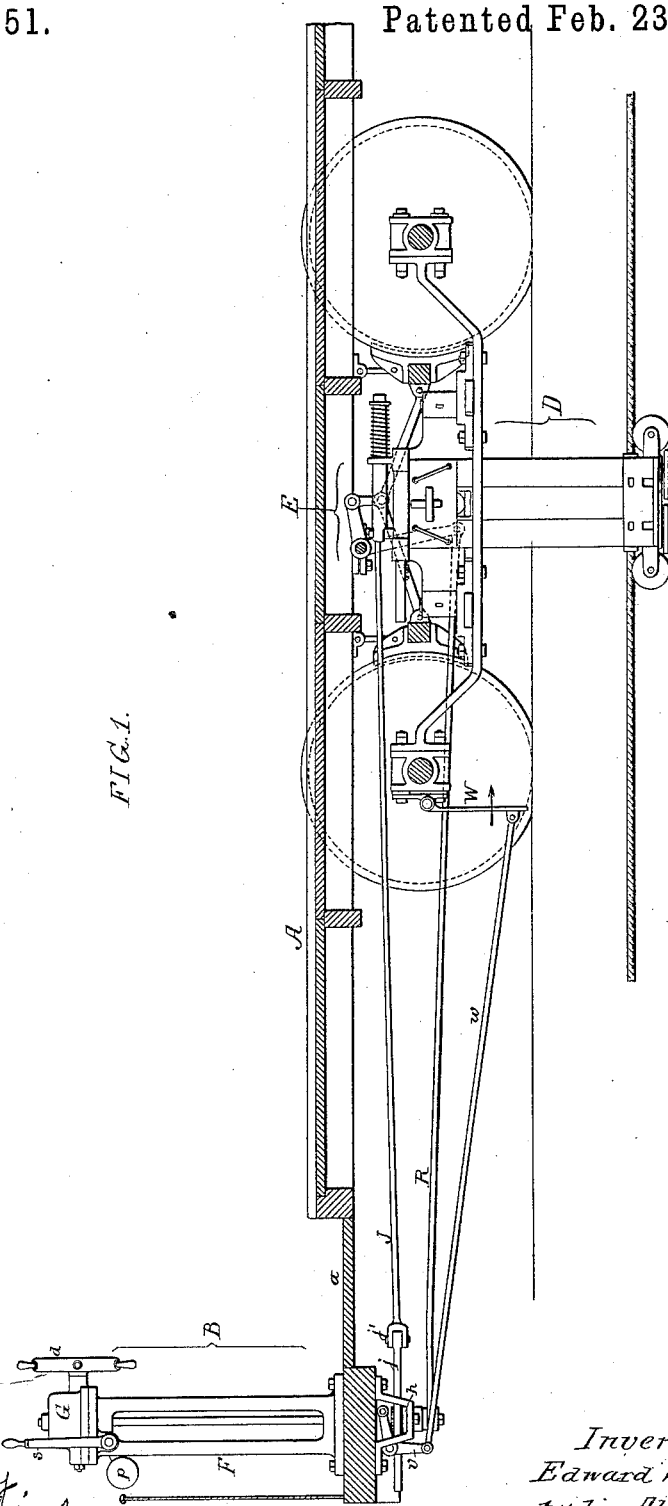
Witnesses:
Harry Drury
David S. Williams
Inventor
Edward Samuel
by his Attorneys
Howson & Sons (No Model.) 3 Sheets—Sheet 2.
E. SAMUEL.
DEVICE FOR CONTROLLING THE MOTIVE POWER AND BRAKES OF POWER DRIVEN CARS.
No. 336,751. Patented Feb. 23, 1886.
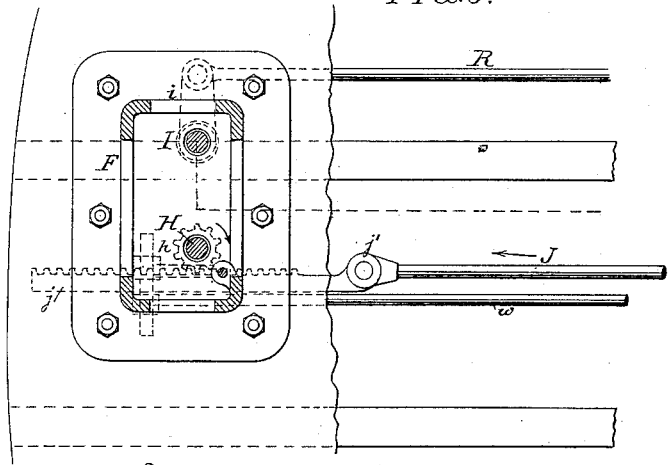
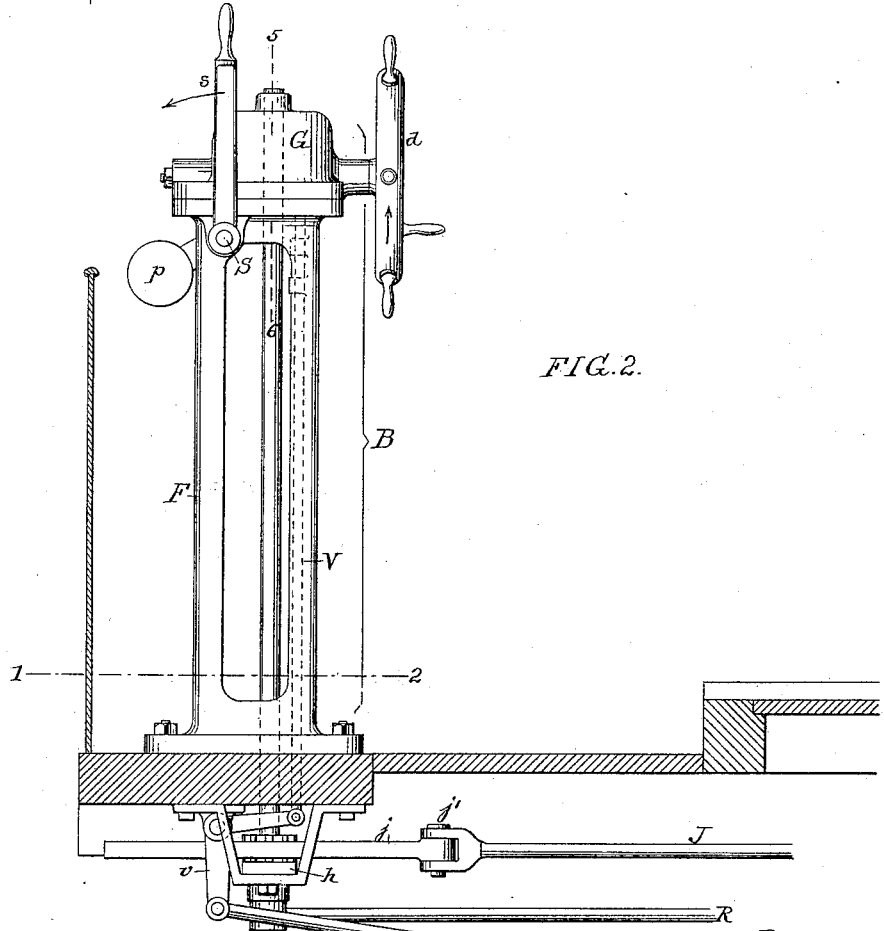

(No Model.)  3 Sheets—Sheet 3.

E. SAMUEL.
DEVICE FOR CONTROLLING THE MOTIVE POWER AND BRAKES OF POWER DRIVEN CARS.

No. 336,751.  Patented Feb. 23, 1886.

Witnesses
Harry Drury
David S. Williams

Inventor
Edward Samuel
by his Attorneys
Howson & Sons

UNITED STATES PATENT OFFICE.

EDWARD SAMUEL, OF PHILADELPHIA, PENNSYLVANIA, ASSIGNOR TO WILLIAM WHARTON, JR., & CO., (LIMITED,) OF SAME PLACE.

DEVICE FOR CONTROLLING THE MOTIVE POWER AND BRAKES OF POWER-DRIVEN CARS.

SPECIFICATION forming part of Letters Patent No. 336,751, dated February 23, 1886.

Application filed October 6, 1885. Serial No. 179,175. (No model.)

*To all whom it may concern:*

Be it known that I, EDWARD SAMUEL, a citizen of the United States, residing in Philadelphia, Pennsylvania, have invented certain Improvements in Devices for Controlling the Motive Power and Brakes of Power-Driven Cars, of which the following is a specification.

My invention relates to improvements in power-driven cars, and the object of my invention is to provide the car with devices for controlling the motive power, whereby the brakes cannot be applied while the motive power is applied for propelling the car, or vice versa.

Figure 5:
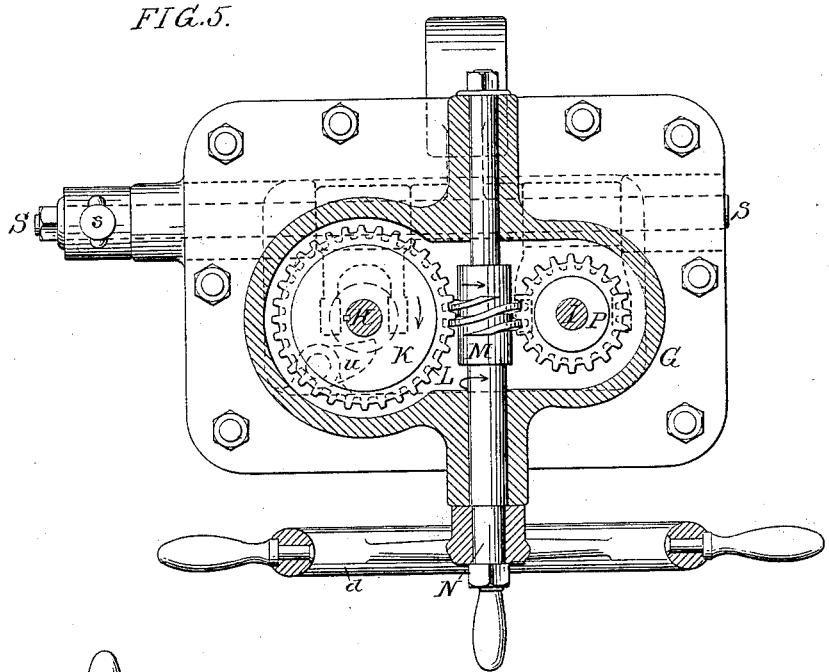
Figure 4:
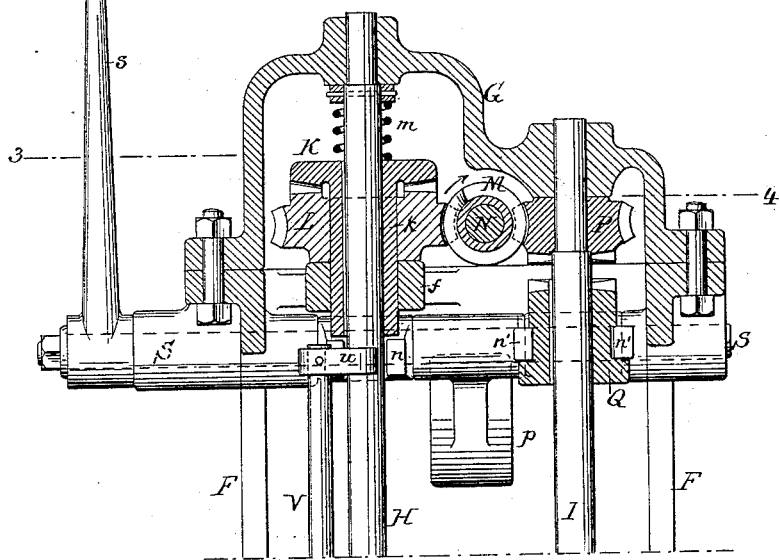

In the accompanying drawings, Figure 1 is a longitudinal section of part of a cable-car with my improvements applied to the cable-gripping device and brakes. Fig. 2 is a side view, drawn to an enlarged scale, of my improved power-controlling device. Fig. 3 is a sectional plan on the line 1 2, Fig. 2. Fig. 4 is a vertical section on the line 5 6, Fig. 2, drawn to an enlarged scale, of the head of the device; and Fig. 5 is a sectional plan on the line 3 4, Fig. 4.

In operating the grip and brake on a cable-car for instance, it has been usual to have two independent operating devices—one for the grip and one for the brake—and often the attendant, especially if unskilled, will apply both at the same time, which has the effect of straining the cable and the grip, and creating unnecessary wear on the cable by the friction of the jaws, and ends generally in distorting the gripping apparatus.

In my improved operating device, it will be seen that the brake cannot be set when the grip is applied, and the grip cannot be applied when the brakes are set.

A is the body of the car, $a$ being the front platform, to which the device B is secured. D is the cable-grip, and E the brake mechanism.

F is a quadrangular post or standard, secured to the platform $a$, and G is a cap secured to the post and incasing all the working parts of the device.

In bearings in the post F and cap G are two vertical shafts, H I, the shaft H having connection with the grip or other controlling device and the shaft I being connected to the brake mechanism, as described hereinafter. To the lower end of the shaft H is secured a pinion, $h$, meshing into a rack, $j$, sliding in guides in the frame of the car and connected to the grip-bar J by a pin, $j'$. To the upper end of the shaft H is adapted the hub $k$ of a clutch, K, so that the latter can slide on but must turn with the shaft, a spline and keyway connection being shown in the present instance for this purpose. The teeth on the clutch K engage with teeth on the worm-wheel L, which is loose on the hub $k$ of the clutch K. The worm-wheel L rests on a bearing, $f$, forming part of the post F. The clutch K is normally kept in gear with the worm-wheel L by its own weight, supplemented by a spring, $m$, interposed between the cap G or a collar on the shaft H and the said clutch. A worm, M, on a horizontal shaft, N, in bearings in the cap, meshes with the worm-wheel L, described above, and this worm M also meshes with a worm-wheel, P, loose on the shaft I, and having clutch-teeth adapted to the teeth of a clutch, Q, which can slide but must turn with the shaft I. The normal position of this clutch Q, owing to its weight or the action of a spring or weight, is clear of the worm-wheel P, for a purpose described hereinafter. The shaft I is connected to the brake-rod R by an arm, $i$, secured at its lower end to the said rod, Fig. 3. A transverse rock-shaft, S, having a handle, $s$, is adapted to bearings in the frame F, and to this shaft are secured two arms, $n$ $n'$, for operating on the clutches K and Q. The arm $n$ acts on the under side of the hub $k$ of the clutch K, and the arm $n'$ is adapted to an annular groove in the hub of the clutch Q. A weight, $p$, on an arm of the rock-shaft S, serves to counterbalance the weight of the arms $n$ $n'$ and the clutches K and Q, so that the operation of said clutches by means of a handle, $s$, may be readily effected.

The shaft N, carrying the worm M, is provided with a hand-wheel, $d$, by turning which rotary motion may be imparted through the medium of the worm-wheel L and clutch K to the shaft H when the parts are in the position shown in Figs. 2 and 4, or by moving the handle $s$ in the direction of the arrow, Fig. 2, the clutch K can be moved out of engagement with the worm-wheel L and the clutch Q into engagement with the worm-wheel P, so that the movement of the shaft N can be transmitted to the shaft I, or the handle s may be only moved to such an extent as to throw the clutch K out of gear without throwing the clutch Q into gear, in which case both of the shafts H and I will be free from the control of the shaft N. When pressure is removed from the handle s, the spring m, acting upon the clutch K, tends to restore the parts to the position shown in Fig. 4.

The operation of the device is as follows: To start the car, the clutches being in their normal positions, Fig. 4, the hand-wheel d is turned in the direction of its arrow, Fig. 2, to rotate the worm M in the direction of its arrow, Fig. 4, and, through the medium of the worm-wheel L and clutch K, the shaft H is rotated in the direction of its arrow, Fig. 5. The shaft, through the medium of the pinion h and rack j, draws the rod J forward and closes the grip-jaws on the cable, or in an electric motor brings the contact-surface against the conductors. The clutch Q on the shaft I during this time is clear of the wheel P, so that the said shaft remains stationary. To stop the car the handle s is moved in the direction of its arrow, Fig. 2, so that the clutch K will first be disengaged, whereupon the usual spring will force open the jaws of the grip and on the continued movement of the arm s the clutch Q will engage with the clutch-teeth of the wheel P. Then by turning the hand-wheel d and worm M in the same direction as before, the brakes will be applied and the car stopped through the medium of the clutch Q, shaft I, arm i, and rod R. To provide for the releasing of the grip from the control of the cable automatically, as is the case when crossing another cable road, or if there is an obstruction on the track, I pivot to any suitable point on the car a lever, W, which extends within a short distance of the mouth of the conduit, as shown in Fig. 1, and is connected to an upright sliding rod, V, in bearings in the post F through the medium of a rod, w, and a bell-crank lever, v. (See Fig. 2.) Secured to the upper end of this rod V is an arm, u, Fig. 4, which projects under the sleeve k of the clutch K. If the lever W strikes any obstruction, it will be forced back in the direction of its arrow, Fig. 1, lifting the rod V up, and thereby releasing the clutch K and shaft H. The usual spring on the grip forces open the grip-jaws. If necessary, the worm can be turned in one direction to grip the cable and in the opposite direction to operate the brakes by placing the arm i and rod R in the positions shown by dotted lines in Fig. 3.

Although I have shown my improvements as applied only to a cable-car, it will be understood that they may be applied to other power-driven cars without departing from my invention.

I claim as my invention—

1. The combination of the power-controlling devices of a power-driven car, the brake and brake-operating mechanism, an operating-shaft N to which power is applied, and clutches and gearing, whereby the movement of said shaft may be transmitted either to the power-controlling device or brake-operating mechanism, substantially as described.

2. The combination of the power-controlling devices of a power driven-car, the brake and brake-operating mechanism, an operating-shaft, N, to which power is applied, and clutches and gearing, whereby said shaft can be connected either to the power-controlling device or brake-operating mechanism, or disconnected from both, all substantially as specified.

3. The combination of shafts H and I, each having clutching mechanism and worm-wheels L and P, with a worm meshing with both worm-wheels and adapted to be turned, substantially as described.

4. The combination of shafts H and I, the shaft H having a clutch, K, and a loose worm-wheel, L, and the shaft I having a clutch, Q, and a loose worm-wheel, P, with a worm, M, adapted to turn either the shaft H or I through the medium of the clutches and worm-wheels, substantially as set forth.

5. The combination of the shaft H and cable-grip controlled thereby, and the clutch K, with a lever, W, and shaft V, connected thereto, having an arm, u, adapted to release the clutch from the control of the attendant when the said lever strikes an obstruction, substantially as described.

6. The combination of the grip and brakes of a car and shafts H and I, controlling the same, with an operating-shaft, N, common to both said shafts H and I, clutches for the latter, and a shaft, S, having connection with both clutches, to throw one out when the other is thrown in, as set forth.

In testimony whereof I have signed my name to this specification in the presence of two subscribing witnesses.

EDWD. SAMUEL.

Witnesses:
HENRY HOWSON,
HARRY SMITH.